(12) United States Patent
Morita et al.

(10) Patent No.: US 12,321,440 B2
(45) Date of Patent: Jun. 3, 2025

(54) CONTROL DEVICE AND PROGRAM VERIFICATION METHOD

(71) Applicant: Hitachi Astemo, Ltd., Hitachinaka (JP)

(72) Inventors: Nobuyoshi Morita, Tokyo (JP); Yasuhiro Fujii, Tokyo (JP); Mikio Kataoka, Tokyo (JP); Masashi Yano, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 281 days.

(21) Appl. No.: 17/924,571

(22) PCT Filed: Feb. 25, 2021

(86) PCT No.: PCT/JP2021/007123
§ 371 (c)(1),
(2) Date: Nov. 10, 2022

(87) PCT Pub. No.: WO2022/009464
PCT Pub. Date: Jan. 13, 2022

(65) Prior Publication Data
US 2023/0147082 A1 May 11, 2023

(30) Foreign Application Priority Data
Jul. 8, 2020 (JP) .................. 2020-117468

(51) Int. Cl.
*G06F 21/44* (2013.01)
*G06F 21/57* (2013.01)
*H04L 9/14* (2006.01)

(52) U.S. Cl.
CPC .............. *G06F 21/44* (2013.01); *G06F 21/57* (2013.01); *H04L 9/14* (2013.01); *G06F 2221/033* (2013.01)

(58) Field of Classification Search
CPC .......... G06F 21/44; G06F 21/57; G06F 21/51; G06F 21/62; G06F 21/64; G06F 2221/33; H04L 9/14; H04L 9/088; H04L 9/3226
See application file for complete search history.

(56) References Cited

U.S. PATENT DOCUMENTS 10,395,026 B2 * 8/2019 Lee .................... G06F 21/51
10,412,191 B1 * 9/2019 Brandwine .......... G06F 9/5077
(Continued)

FOREIGN PATENT DOCUMENTS

JP    10-211341 A    8/1998
JP    2009-043085 A    2/2009
(Continued)

OTHER PUBLICATIONS

Japanese Office Action issued in corresponding JP Application No. 2020-117468 with Machine translation, dated Mar. 19, 2024 (12 pages).
(Continued)

*Primary Examiner* — Sarah Su
(74) *Attorney, Agent, or Firm* — Foley & Lardner LLP

(57) ABSTRACT

Provided are a control device and a program verification method capable of suppressing an operation load in a case where different keys are used for respective devices. The control device 1 stores a program to be verified, a plurality of verification expected values related to verification of the program to be verified, and registered verification expected value information 183 that identifies one of the verification expected values. The control device verifies whether the program to be verified is correct using the registered verification expected value information 183.

8 Claims, 6 Drawing Sheets

1001

| VERIFICATION EXPECTED VALUE REFERENCE ADDRESS INFORMATION |
|---|
| 0 x 0 E 0 6 2 0 0 0 |

(56) References Cited

U.S. PATENT DOCUMENTS

| | | | |
|---|---|---|---|
| 10,999,078 B2 * | 5/2021 | Kawabata | H04L 9/16 |
| 2003/0009687 A1 * | 1/2003 | Ferchau | G06F 21/64 |
| | | | 713/176 |
| 2008/0232598 A1 * | 9/2008 | Vennelakanti | G06F 21/62 |
| | | | 380/279 |
| 2015/0227731 A1 * | 8/2015 | Grigg | H04L 63/10 |
| | | | 726/7 |
| 2016/0224787 A1 * | 8/2016 | Guy | H04L 63/08 |
| 2020/0175151 A1 * | 6/2020 | Sanders-Reed | G06F 11/1487 |
| 2020/0202289 A1 * | 6/2020 | Lau | G06F 21/64 |
| 2021/0126946 A1 * | 4/2021 | Chou | H04L 9/3073 |
| 2023/0114009 A1 * | 4/2023 | Morita | G06F 8/65 |
| | | | 726/22 |
| 2024/0020386 A1 * | 1/2024 | Morita | G06F 21/572 |

FOREIGN PATENT DOCUMENTS

| | | | | |
|---|---|---|---|---|
| JP | 2009-284231 A | | 12/2009 | |
| JP | 2015-022521 A | | 2/2015 | |
| JP | 2016-111446 A | | 6/2016 | |
| KR | 20220148323 A | * | 11/2022 | G06F 12/109 |
| WO | WO-2010041464 A1 | * | 4/2010 | G06F 21/445 |
| WO | WO-2019142307 A1 | * | 7/2019 | G06F 21/57 |
| WO | WO-2019217934 A1 | * | 11/2019 | G06F 11/362 |
| WO | WO-2021159818 A1 | * | 8/2021 | G06F 21/6218 |
| WO | WO-2024236801 A1 | * | 11/2024 | |

OTHER PUBLICATIONS

International Search Report and Written Opinion in International Application No. PCT/JP2021/007123 dated May 11, 2021.

* cited by examiner

FIG. 4

| KEY ID | KEY VALUE | KEY LENGTH |
|---|---|---|
| 0 x 0 1 | 0 x E 5 C 3 D A 8 E 4 4 D A C D 3 F B C 4 E 5 4 E 1 8 E 2 3 9 D A 7 | 1 2 8 |
| . . . | . . . | . . . |

| PROGRAM A |
|---|
| . . . |
| VERIFICATION EXPECTED VALUE 1 |
| VERIFICATION EXPECTED VALUE 2 |
| VERIFICATION EXPECTED VALUE 3 |
| . . . |

| VERIFICATION EXPECTED VALUE MEMORY MAP INFORMATION | |
|---|---|
| KEY ID | VERIFICATION EXPECTED VALUE ADDRESS |
| 0 x 0 1 | 0 x 0 E 0 6 2 0 0 0 |
| 0 x 0 2 | 0 x 0 E 0 6 2 0 1 0 |
| 0 x 0 3 | 0 x 0 E 0 6 2 0 2 0 |
| . . . | . . . |

REGISTERED VERIFICATION EXPECTED VALUE INFORMATION ～183

| REGISTERED VERIFICATION EXPECTED VALUE INFORMATION |
|---|
| 0x0E062010 |

| VERIFICATION TARGET ID (801) | VERIFICATION CONTENT (802) | VERIFICATION TARGET ADDRESS (803) |
|---|---|---|
| 0x01 | PROGRAM A | {0x00000000, 0x0050C000} |
| 0x02 | PROGRAM B | {0x0050C001, 0x00FFFFFF} |
| ... | ... | ... |

CONTROL DEVICE AND PROGRAM VERIFICATION METHOD

TECHNICAL FIELD

The present invention relates to a control device and a program verification method.

BACKGROUND ART

In an embedded system mounted on an automobile, a home appliance, a medical device, or the like, there is a concern that when software or firmware is illegally rewritten by an attacker, serious damage may be caused. As a countermeasure against such a threat, secure boot capable of activating only an untampered program at the time of program activation has been studied. As a method of secure boot, at the time of program activation, a verification value is calculated using a program to be verified, a verification process based on an encryption technique, and a key used in the verification process, and whether the verification value matches a verification expected value calculated in advance is verified.

For example, the technology of PTL 1 discloses a key generation device including a tampering verification unit that verifies whether software has been tampered using software proof information, and the tampering verification unit prohibits key generation by the key generation unit when determining that the software has been tampered. According to such a technology of PTL 1, it is possible to verify that the program to be activated is not tampered and to prohibit the activation of the program when it is determined that the program is tampered.

In a tamper detection technique such as secure boot, an encryption technique is generally used. In the encryption technique, a key that is required to be kept secret is used, but when the key is compromised even once, the security of secure boot itself cannot be secured. As one of methods for reducing the risk of key compromise, it is conceivable to use different keys for respective devices. As a result, even when the key is compromised, it can be expected that the influence is limited to the device using the same key.

CITATION LIST

Patent Literature

PTL 1: JP 2009-284231 A

SUMMARY OF INVENTION

Technical Problem

However, the conventional technique has a problem that an operation load is large when different keys are used for respective devices.

An example of the operation load will be described. In a case where different keys are used for respective devices, the key is designated in the manufacturing process (for example, at the time of factory shipment). At this time, it is necessary to create and manage association information indicating which key is used for which device in advance, and input the key and the verification expected value according to the association information. As described above, it is necessary to select an appropriate key with reference to the association information not only at the time of use but also at the time of manufacturing, and an operation load is large.

The present invention has been made in view of the above problems, and an object thereof is to provide a control device and a program verification method capable of suppressing an operation load in a case where different keys are used for respective devices.

Solution to Problem

An example of a control device according to the present invention stores a program to be verified, a plurality of verification expected values related to verification of the program to be verified, and information for identifying one of the verification expected values, wherein the control device verifies whether the program to be verified is correct using the identified verification expected value.

Further, a program verification method according to the present invention is executed by a control device storing a program to be verified, a plurality of verification expected values related to verification of the program, to be verified, and information for identifying one of the verification expected values, wherein the control device verifies whether the program to be verified is correct using the identified verification expected value.

This specification includes the disclosure of Japanese Patent Application No. 2020-117468, which is the basis of the priority of the present application.

Advantageous Effects of Invention

According to the control device and the program verification method of the present invention, it is possible to suppress an operation load in a case where different keys are used for respective devices.

BRIEF DESCRIPTION OF DRAWINGS

FIG. 4 is a diagram illustrating an example of a data structure of key-related information.

FIG. 5 is a diagram illustrating an example of a data structure of program structure information.

FIG. 6 is a diagram illustrating an example of a data structure of verification expected value memory map information.

FIG. 7 is a diagram illustrating an example of a data structure of registered verification expected value information.

FIG. 8 is a diagram illustrating an example of a data structure of verification range information.

DESCRIPTION OF EMBODIMENTS

Hereinafter, embodiments of the present invention will be described in detail with reference to the drawings using embodiments.

First Embodiment

Figure 1:
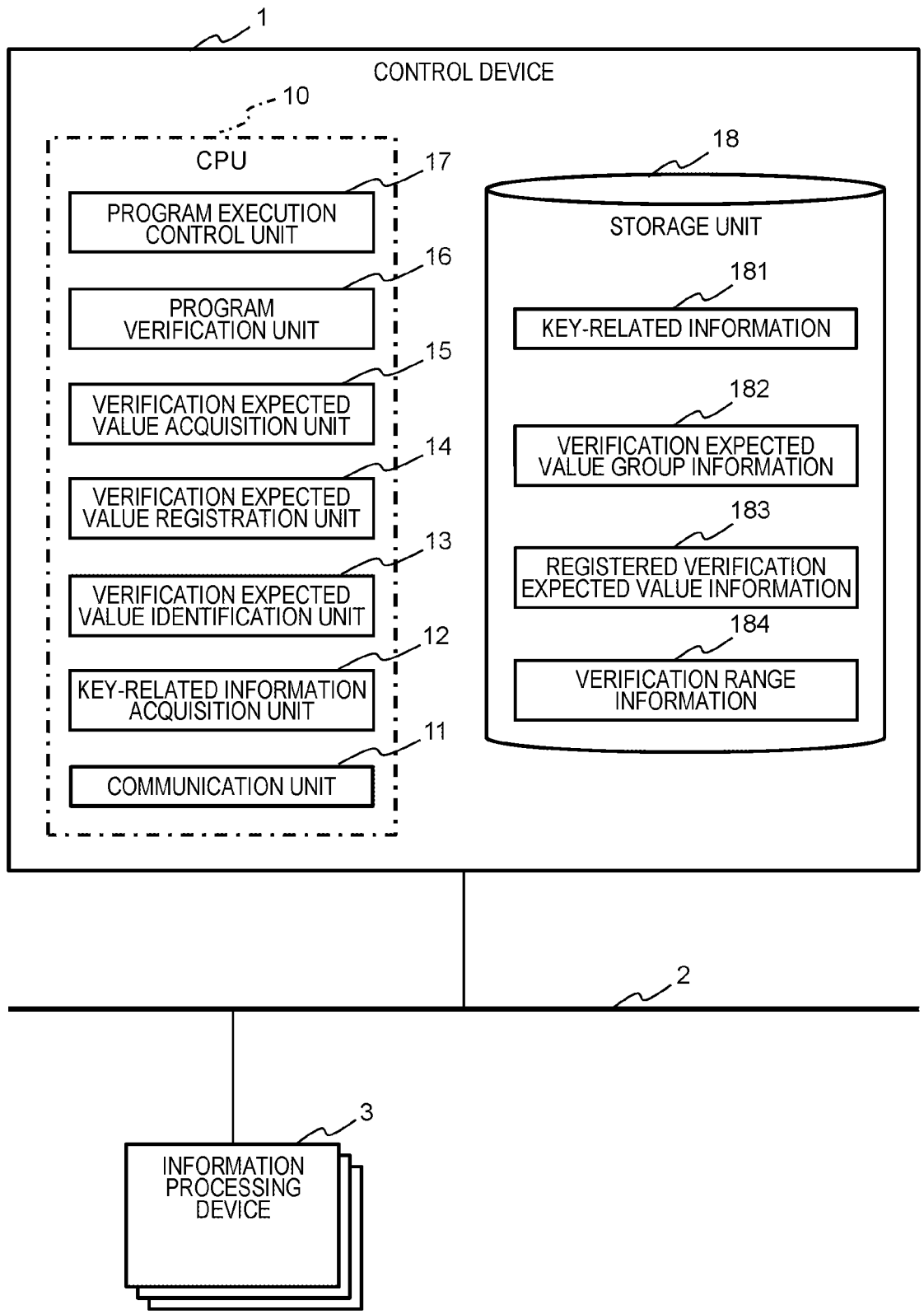
FIG. 1 is a diagram illustrating a configuration example of a control device according to a first embodiment of the present invention.

FIG. 1 illustrates a configuration example of a control device 1 according to a first embodiment. In the present embodiment, the control device 1 is an information processing device connected to a vehicle-mounted network, but the technical idea of the present invention is not limited to this example.

The control device 1 has a secure boot function. That is, the control device 1 can verify whether the program to be activated (program to be verified) is correct using the verification expected value by executing the program verification method described in the present specification.

Here, the meaning of the expression "program is correct" can be appropriately understood by those skilled in the art, but for example, means that the program is the same as a program intended to be executed by a designer or a user, and/or means that the program has not been tampered with by unauthorized means. The determination as to whether the program is correct can be made based on, for example, whether the verification value matches the verification expected value as described later.

The control device 1 is connected to an information processing device 3 via a communication bus 2. The information processing device 3 is, for example, an information processing device connected to a vehicle-mounted network, and may be a control device. The information processing device 3 is, for example, a computer having a known configuration. The communication bus 2 may be physically a plurality of communication buses, and communication standards of the respective communication buses may be the same or different. The communication standards are CAN (registered trademark), LIN (registered trademark), FlexRay (registered trademark), Ethernet (registered trademark), and the like.

The control device 1 can be configured using a known computer, and includes, for example, a calculation unit and a storage unit 18. The calculation unit includes, for example, a processor. The processor is, for example, a CPU 10. The storage unit 18 includes a ROM (not illustrated) and a RAM (not illustrated). In addition, the storage unit 18 includes a nonvolatile storage device.

The CPU 10 develops the program stored in the ROM in the RAM and executes the program, whereby the control device 1 implements the functions described in the present specification. That is, the control device 1 includes, as functional units thereof, a communication unit 11, a key-related information acquisition unit 12, a verification expected value identification unit 13, a verification expected value registration unit 14, a verification expected value acquisition unit 15, a program verification unit 16, and a program execution control unit 17.

An example of the function of each functional unit will be described below. The communication unit 11 is a communication interface and performs calculation necessary for communication. The communication unit 11 receives a message transmitted from the information processing device 3 via the communication bus 2 and transmits a message to the information processing device 3 via the communication bus 2. As described above, the communication bus 2 physically includes a plurality of communication buses. The control device 1 transmits and receives information necessary for program update using the communication unit 11.

The key-related information acquisition unit 12 acquires key-related information registered in the control device 1. The verification expected value identification unit 13 identifies a verification expected value suitable for the key value acquired by the key-related information acquisition unit 12 from a plurality of verification expected values stored in the storage unit 18. The verification expected value registration unit 14 registers the verification expected value identified by the verification expected value identification unit 13 as a verification expected value used for the program verification process. The verification expected value acquisition unit 15 acquires the verification expected value registered by the verification expected value registration unit 14 at the time of program verification. The program verification unit 16 verifies that the program to be activated is correct. The program execution control unit 17 executes the program only when it is confirmed that the program to be activated is correct.

The storage unit 18 stores key-related information 181 including a key value used at the time of program verification, verification expected value group information 182 in which a plurality of verification expected values is stored, registered verification expected value information 183 in which the verification expected value used at the time of program verification is stored in advance, and verification range information 184 indicating a verification target range of program verification.

The control device 1 stores program structure information. FIG. 5 illustrates an example of a data structure of program structure information 501. The program structure information 501 includes at least one type of program. This program is a program to be verified. In addition, the program structure information 501 includes verification expected values calculated for the program using any key values where the number of verification expected values is as many as the number of types of keys to be distinguished.

In the example of FIG. 5, the program structure information 501 includes a program A (program to be verified). In addition, the program structure information 501 includes a verification expected value 1 calculated from the program A and a key value 1, a verification expected value 2 calculated from the program A and a key value 2, and a verification expected value 3 calculated from the program A and a key value 3.

These verification expected values are calculated in advance and stored in the storage unit 18. That is, the verification expected values corresponds to respective key values, and each verification expected value is calculated based on the corresponding key value and the program A. This calculation processing can be generally performed by any computer, and may be performed by the control device 1 or another computer, for example. In addition, the verification expected value is calculated by executing an encryption processing operation. As an example of the encryption processing operation, an operation by a message authentication code (MAC) method using a common key, an operation by an RSA method using a public key, a signature operation by ECDSA or the like, or the like can be used. Note that this encryption processing operation can have the same scheme as the encryption processing operation used in step 304 described later.

As described above, the control device 1 stores the program to be verified and the plurality of verification expected values related to verification of the program to be verified.

Figure 2:
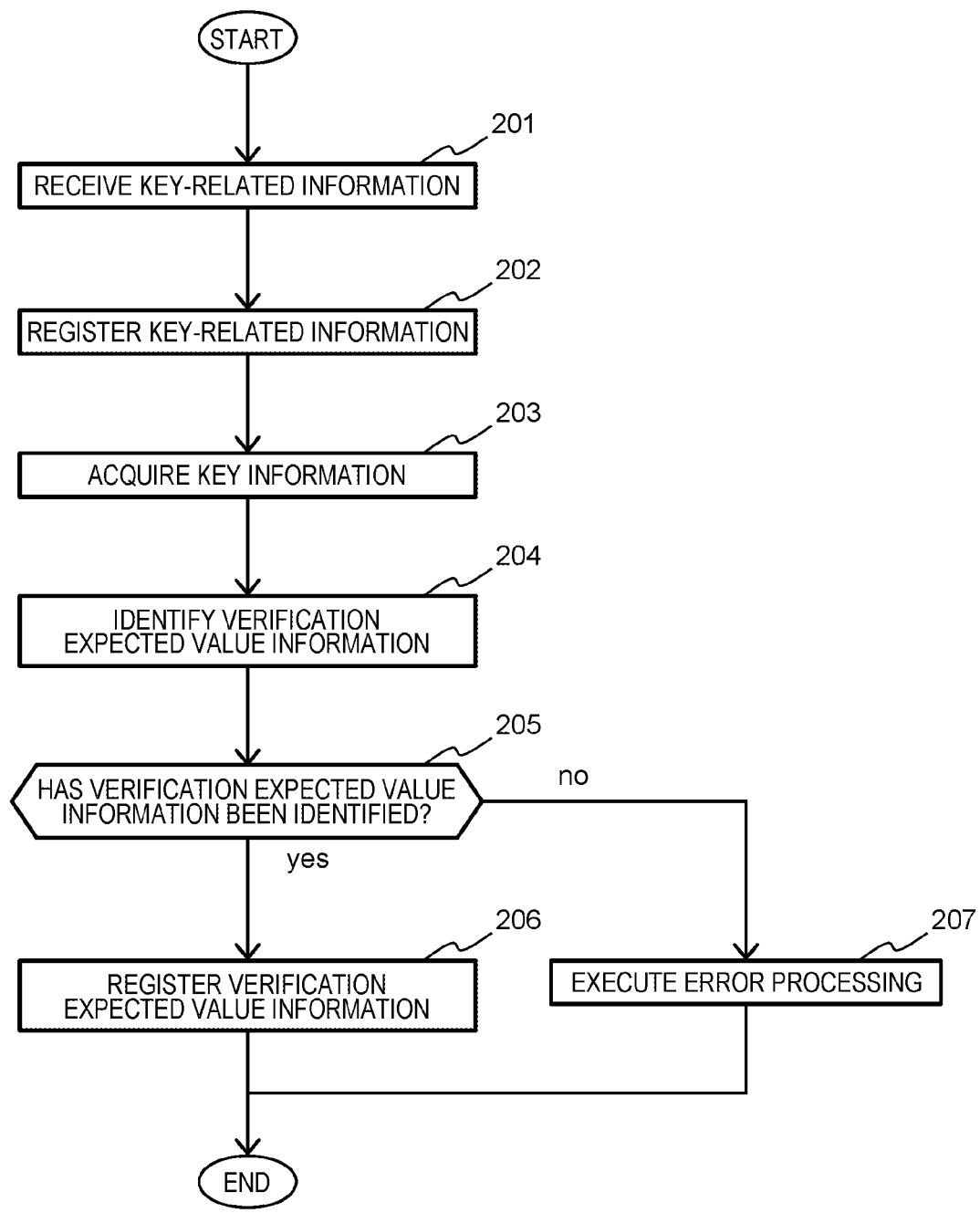
FIG. 2 is a diagram illustrating an example of a processing flow in which the control device registers a verification expected value.

FIG. 2 is a flowchart illustrating an example of a process when the control device 1 registers a verification expected value. This process is executed at the first timing (for example, at the time of factory shipment of the product related to the control device 1). The product is, for example, a vehicle. At this timing, the program to be verified does not need to be executed (but may be executed). An execution entity for each step described below is the CPU 10 of the control device 1.

In step 201, the control device 1 (for example, the communication unit 11) receives the key-related information 181.

FIG. 4 illustrates an example of a data structure of the key-related information 181. The key-related information 181 includes, for each key, a key ID 401 for identifying the key, a key value 402 indicating a value used for program verification, and a key length 403 indicating a length of the key value 402. Note that "Ox" in the figure represents hexadecimal digit, and the same applies to the other figures.

As described above, since the control device 1 stores the key length 403 for each key value 402, it is possible to cope with a case where the key lengths are different from each other.

In this step, it is desirable to securely transmit and receive the key-related information 181. For example, a secret encryption process may be performed on the key-related information, a tampering detection code may be further given to the key-related information to transmit and receive the information, and the tampering detection process and the decryption process may be performed after the reception. Alternatively, the control device 1 may receive the key-related information in an environment where confidentiality and integrity are ensured by operation.

In step 202, the control device 1 stores the key-related information 181 in the storage unit 18 and registers the key-related information. The key-related information 181 to be registered includes information on one or more keys.

In step 203, the control device 1 (for example, the key-related information acquisition unit 12) acquires the key ID 401 used for program verification. The key ID 401 is a single value and is input by, for example, an operator.

Here, the operator does not need to identify and input a specific key ID, and can input an any key ID from the available range. Therefore, for example, the key ID can be freely determined without referring to a table or the like associating the product and the key ID, and only the determined result may be recorded. In this way, the operation load is suppressed.

In addition, the operator does not need to input the same key ID for all the products (that is, all the control devices 1), and can change the key ID for each product (that is, for each control device 1). Therefore, different keys can be used for respective control devices 1. Therefore, even when the content of a certain key is compromised, the influence is limited. Note that a unique key may be used for each product, but it is not necessary to do so (that is, a certain key may be commonly used for the plurality of control devices 1).

In step 204, the control device 1 (for example, the verification expected value identification unit 13) identifies the verification expected value information.

FIG. 6 illustrates an outline of verification expected value memory map 600 which is referred to by the verification expected value identification unit 13 in step 204. The verification expected value memory map 600 includes verification expected value information. The control device 1 stores the verification expected value memory map 600 in advance.

The verification expected value memory map 600 associates a key ID 601 (key identification information) for identifying each of a plurality of key values with a verification expected value address 602 (address information) at which a verification expected value corresponding to each key ID 601 is stored. The key ID 601 corresponds to the key ID 401 illustrated in FIG. 4.

In this manner, the control device 1 stores a plurality of key values related to verification of the program to be verified. As a result, as described above, the operator can input an any key ID.

The control device 1 refers to the verification expected value memory map 600 based on the key ID 401 acquired in step 203, and identifies the verification expected value address 602 associated with the corresponding key ID 601. In the present embodiment, it is assumed that the verification expected value memory map 600 is received together with the key-related information in step 201, but the verification expected value memory map 600 may be stored in the control device 1 in advance.

It is determined in step 205 whether the corresponding verification expected value address can be identified in step 204. When the identification has been made, the process by the control device 1 proceeds to step 206, and when the identification has not been made, the process by the control device 1 proceeds to step 207.

In step 206, the control device 1 (for example, the verification expected value registration unit 14) stores the verification expected value address 602, as the registered verification expected value information 183, identified in step 204 in the storage unit 18, and registers the address.

FIG. 7 illustrates an example of a data structure of the registered verification expected value information 183. The registered verification expected value information 183 is information for identifying one of the verification expected values. The registered verification expected value information 183 includes a value indicating an address at which the verification expected value corresponding to the key ID acquired in step 203 is stored. In this way, even when the verification expected value is long, the verification expected value can be identified with a relatively small storage capacity. As a modification, the registered verification expected value information 183 may be a value indicating the verification expected value itself.

In step 207, the control device 1 (for example, the verification expected value registration unit 14) determines that the corresponding verification expected value has not been correctly identified and executes error processing. The error processing includes a process of recording the operation as a log, a process of stopping the activation of the program, and the like.

Through the above steps, the verification expected value corresponding to the key value 402 stored in the control device 1 can be identified as the registered verification expected value information 183.

Figure 3:
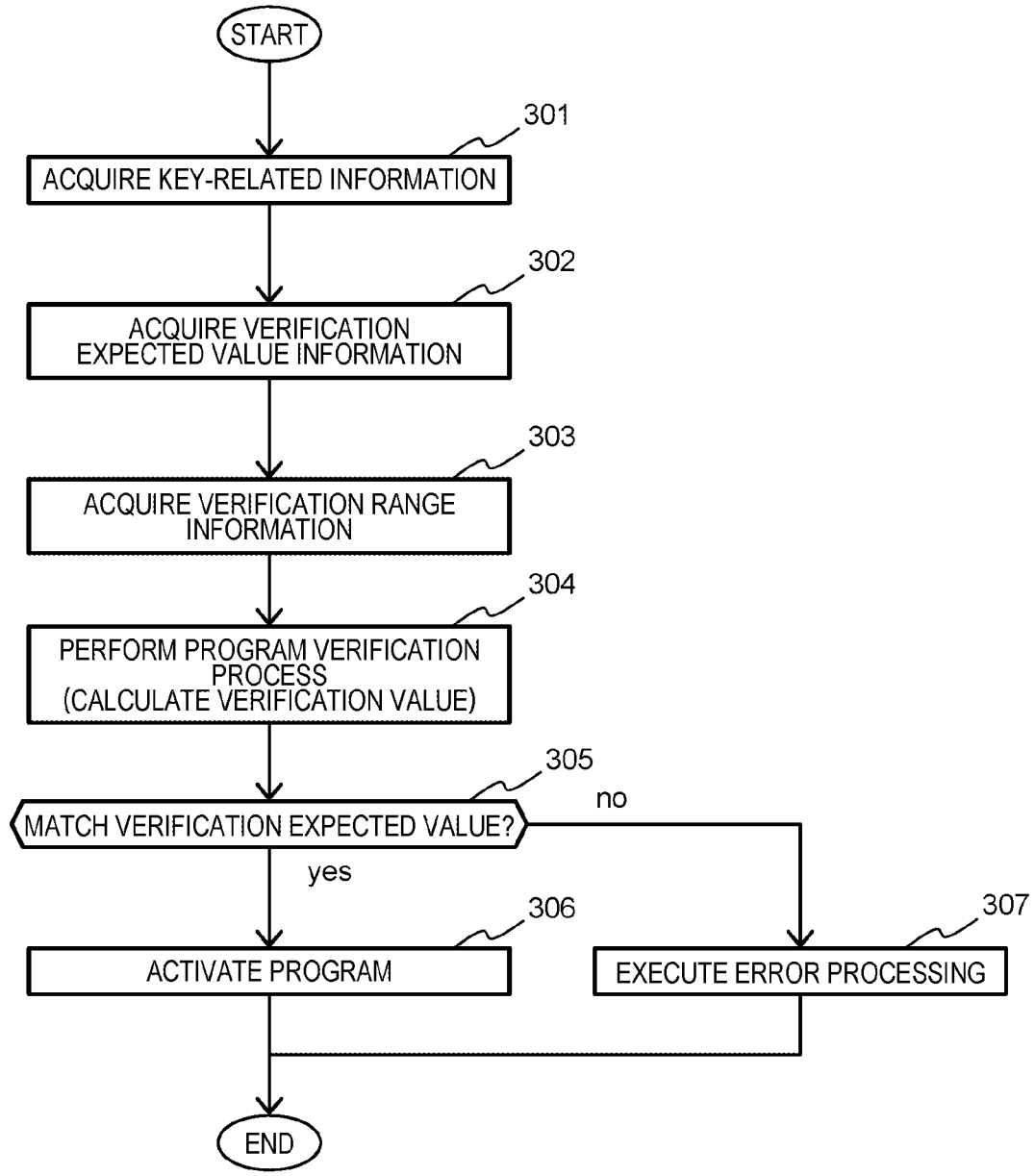
FIG. 3 is a diagram illustrating an example of a processing flow in which the control device verifies a program.

FIG. 3 is a flowchart illustrating processing when the control device 1 verifies the program. This processing is executed at the second timing (for example, when an owner of a product related to the control device 1 uses the product). More specifically, when the control device 1 is instructed to execute a program to be verified, the control device 1 verifies whether the program is correct by executing the process of FIG. 3. An execution entity for each step described below is the CPU 10 of the control device 1.

In step 301, the control device 1 (for example, the key-related information acquisition unit 12) refers to the key-related information 181 and acquires the predetermined key value 402. This key value 402 can be designated in advance. For example, in the process of FIG. 2, information indicating the key value 402 corresponding to the identified verification expected value may be stored, or this information may be separately input.

In step 302, the control device 1 (for example, the verification expected value acquisition unit 15) refers to the registered verification expected value information 183 and acquires the registered verification expected value information 183.

In step 303, the control device (for example, the program verification unit 16) refers to the verification range information and acquires the address of the program to be verified.

FIG. 8 illustrates an example of the verification range information 184. The verification range information 184 is referred to in order for the program verification unit 16 to acquire the verification range in step 303 described above. In this manner, the control device 1 stores the verification range for the program to be verified.

The verification range information 184 includes a verification target ID 801 (not corresponding to a key ID) indicating an identifier for identifying a program to be verified, a verification content 802 indicating verification content, that is, the name of the program, and the like, and a verification target address 803, (verification range) indicating address information, at which the verification target is stored. In this example, the verification range includes a start address and an end address, and the program is stored in an area from the start address to the end address.

In step 304, the control device 1 (for example, the program verification unit 16) calculates a verification value based on the key value 402 acquired in step 301 and the program corresponding to the verification target address 803 acquired in step 303.

The verification value is calculated by executing an encryption processing operation. As an example of the encryption processing operation, an operation by a message authentication code (MAC) method using a common key, an operation by an RSA method using a public key, a signature operation by ECDSA or the like, or the like can be used. Note that this encryption processing operation can be the same scheme as the encryption processing operation used to calculate the verification expected value in FIG. 5 and the like.

In this way, even when the product is used, the program can be verified using the verification expected value set at the time of manufacturing.

In addition, since the control device 1 verifies whether the program is correct based on the verification range illustrated in FIG. 8, it is possible to flexibly define a portion, of the program, to be particularly a verified.

In step 305, the control device 1 (for example, the program verification unit 16) compares the verification value calculated in step 304 with the registered verification expected value information 183 acquired in step 302. In this manner, the control device 1 verifies whether the program to be verified is correct using one of the plurality of verification expected values.

When the verification value matches the verification expected value, the process by the control device 1 proceeds to step 306. This corresponds to a case where the program is correct. When the verification value does not match the verification expected value, the process by the control device 1 proceeds to step 307. This corresponds to a case where the program is not correct.

As described above, the control device 1 verifies whether the program to be verified is correct using one verification expected value identified as the registered verification expected value information 183 of FIG. 7 of the plurality of verification expected values. Therefore, it is possible to realize the secure boot function at the time of use while reducing the operation load as described above at the time of manufacturing the product.

In step 306, the control device 1 (for example, the program execution control unit 17) executes the program. In step 307, the control device 1 (for example, the program execution control unit 17) does not execute the program. In addition, in step 307, error processing similar to that in step 207 may be executed. By this determination process, the secure boot function is realized.

Note that, when verifying the program, the programs related to all the verification target IDs 801 may be verified collectively. In this case, the processing from step 301 to step 307 is performed only once for all the verification target IDs 801 at the same time.

Alternatively, the program may be verified for each verification target ID 801. In this case, in the process of steps 201 to 206, a plurality of pieces of verification expected value information is registered in the registered verification expected value information 183, and the process of steps 301 to 307 is repeatedly performed by the number of verification target IDs 801.

According to the above steps, the program can be safely activated in the control device 1 (for example, the control device connected to the vehicle-mounted network).

In the present embodiment, the control device receives the key-related information and the verification expected value memory map in order to identify the verification expected value in steps 201 to 207. However, the verification expected value can be identified by any method, and for example, the verification expected value may be dynamically identified based on pre-registered key information.

Second Embodiment

Figure 9:
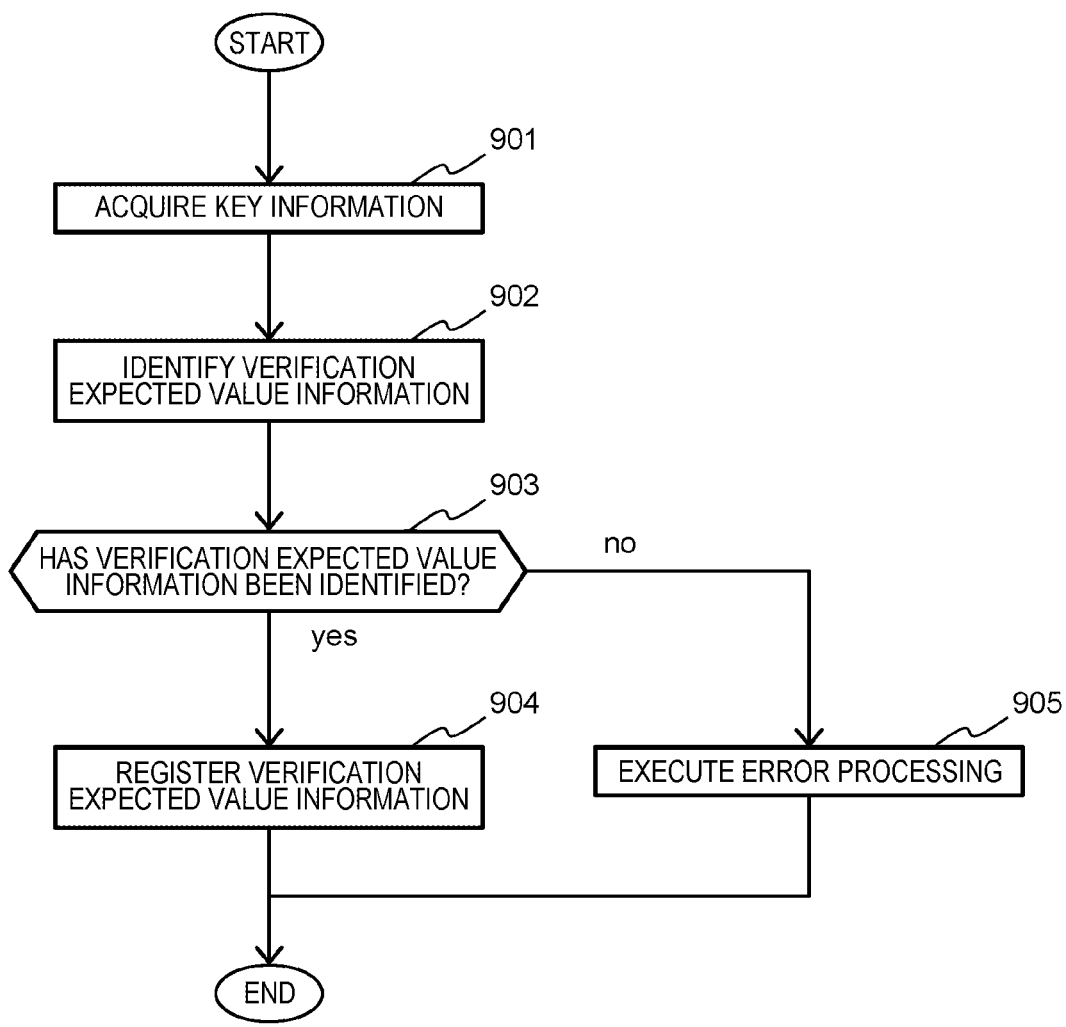
FIG. 9 is a diagram illustrating an example of a processing flow in which a control device according to a second embodiment of the present invention registers a verification expected value.

FIG. 9 is a flowchart illustrating processing when the control device according to a second embodiment of the present invention registers the verification expected value. In the second embodiment, the process of FIG. 2 is replaced with the process of FIG. 9 in the first embodiment. Hereinafter, description of parts common to the first embodiment may be omitted. An execution entity for each step described below is the CPU 10 of the control device 1.

In step 901, the control device 1 (for example, the key-related information acquisition unit 12) refers to the key-related information 181 to acquire the key ID.

In step 902, the control device 1 (for example, the verification expected value identification unit 13) identifies address information in which the verification expected value is stored.

Figure 10:
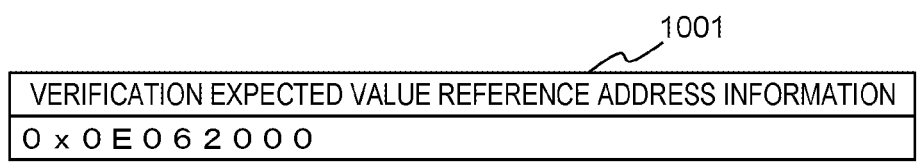
FIG. 10 is a diagram illustrating an example of a data structure of verification expected value reference address information.

FIG. 10 illustrates an example of a data structure of the verification expected value reference address information used in step 902. The control device 1 acquires verification expected value reference address information 1001, and identifies the address information in which the verification expected value is stored using the key ID acquired in step 901 and the verification expected value reference address information 1001.

For example, the verification expected value reference address information 1001 represents a reference address representing a reference position for searching for a verification expected value. The control device 1 can acquire the address of each verification expected value by sequentially adding the length of the verification expected value to the reference address. For example, the first verification expected value is stored at the reference address. The second verification expected value is stored in an address obtained by adding the length of the first verification expected value to the reference address. The third verification expected value is stored at an address obtained by adding the length of the first verification expected value and the length of the second verification expected value to the reference address.

The process of steps 903, 904, and 905 may be similar to that of steps 205, 206, and 207 of FIG. 2, respectively.

Through the above steps, the verification expected value corresponding to the key value 402 stored in the control device 1 can be identified as the registered verification expected value information 183.

As described above, according to the first and second embodiments, even in a case where different keys are stored for respective devices, the program is verified by the combination of the correct key value and the verification expected value at the time of program activation, and the program that is not likely to be tampered can be activated while reducing the influence of key compromise. In addition, the key values are different for respective devices, but the program-related information is common to respective devices, so that it can be expected to suppress the operation load of the device manufacturer or the program update operator.

For example, when the operator inputs different key IDs for respective devices, an any key ID can be input from among a plurality of available key IDs without referring to a predetermined key ID. Therefore, the operator can freely determine the key ID without referring to the key correspondence table or the like, and only the determined result may be recorded. In this way, the operation load is suppressed.

For example, in the case of an in-vehicle control device, by making the verification expected value different for each predetermined number of devices (for example, every 10, every 100, or every 1000), the influence of key compromise can be limited to the number of devices.

REFERENCE SIGNS LIST 1 control device
183 registered verification expected value information (information for identifying one of verification expected values)
402 key value
403 key length
501 program structure information (program to be verified, verification expected value)
600 verification expected value memory map (memory map)
803 verification target address (verification range)

All publications, patents, and patent applications cited in this specification are incorporated herein by reference in their entirety.

The invention claimed is:

1. A control device comprising at least one processor and memory, to:
store at least a program to be verified, a plurality of verification expected values related to verification of the program, and information comprising an address for identifying one of the plurality of verification expected values,
identify a verification expected value from the plurality of verification expected values based on the address,
generate a verification value by executing an encryption processing operation using a predetermined key value and the program to be verified as inputs,
verify whether the program is correct based on a comparison between verification value and the identified verification expected value, and
execute the program in response to verifying that the program is correct.

2. The control device according to claim 1, wherein the control device stores a plurality of key values related to the verification of the program to be verified, and
each of the verification expected values is calculated by the control device or another computer executing the encryption processing operation based on a corresponding key value of the plurality of key values and the program to be verified.

3. The control device according to claim 2, wherein the control device is to store a key length for each of the plurality of key values.

4. The control device according to claim 1, wherein
the control device stores a memory map, and
the memory map associates key identification information for identifying each of a plurality of key values with the address at which the verification expected value corresponding to each key identification information is stored.

5. The control device according to claim 1, wherein the control device is to:
receive an instruction to execute the program to be verified, and
verify, in response to receiving the instruction, whether the program to be verified is correct, and wherein
when the program is correct, the control device is to executes the program, or
when the program is not correct, the control device is to prevent execution of the program.

6. The control device according to claim 1, wherein
to verify whether the program is correct, the control device is to:
compare the verification value to the identified verification expected value, and
determine that the program is correct based on the verification value matches the identified verification expected value, or
determine that the program is not correct based on the verification value not matching the identified verification expected value.

7. The control device according to claim 1, wherein
the control device is to store a verification range for the program to be verified, and
the control device is to verify whether the program is correct based on the verification range related to the program.

8. A program verification method executed by a control device, comprising:
storing at least a program to be verified, a plurality of verification expected values related to verification of the program, and information comprising an address for identifying one of the plurality of verification expected values,
identifying a verification expected value from the plurality of verification expected values based on the address, generating a verification value by executing an encryption processing operation using a predetermined key value and the program to be verified as inputs,
verifying whether the program based on a comparison between verification value and the identified verification expected value, and
executing the program in response to verifying that the program is correct.

\* \* \* \* \*